United States Patent [19]
Frosch et al.

[11] 4,070,116
[45] Jan. 24, 1978

[54] GAP MEASURING DEVICE FOR DEFINING THE DISTANCE BETWEEN TWO OR MORE SURFACES

[75] Inventors: Albert Frosch, Herrenberg; Walter Mannsdorfer, Aidlingen; Claus Scheuing, Lorch, all of Germany

[73] Assignee: International Business Machines Corporation, Armonk, N.Y.

[21] Appl. No.: 695,293

[22] Filed: June 11, 1976

[30] Foreign Application Priority Data

June 23, 1975   Germany ............................. 2527908

[51] Int. Cl.² ............................................... G01B 9/00
[52] U.S. Cl. ..................................... 356/156; 250/201; 356/167
[58] Field of Search .............. 356/156, 125, 161, 167, 356/120; 250/201, 560; 350/81, 6, 41

[56] References Cited

U.S. PATENT DOCUMENTS

| 3,327,584 | 6/1967 | Kissinger | 356/156 |
| 3,715,165 | 7/1973 | Smith | 356/167 |

FOREIGN PATENT DOCUMENTS

| 1,911 | 1972 | Japan | 356/125 |

OTHER PUBLICATIONS

Frosch et al., "Optical Surface Microtopography Measurement &/or Automatic Focussing", IBM. Tech. Disc. Bull. vol. 15, 7-1972, pp. 504–505.

Frosch, A. "Optical Gapmeter", IBM Tech. Disc. Bull. vol. 16, 3-1974, p. 3284.

*Primary Examiner*—Paul A. Sacher
*Assistant Examiner*—Wm. H. Punter
*Attorney, Agent, or Firm*—Henry Powers

[57] ABSTRACT

Disclosed is an apparatus for measuring the distance between two or more surfaces by means of a periodically shiftable imaging system and focus detectors.

9 Claims, 4 Drawing Figures

GAP MEASURING DEVICE FOR DEFINING THE DISTANCE BETWEEN TWO OR MORE SURFACES

SUMMARY OF THE INVENTION AND STATE OF THE PRIOR ART

The present invention relates to gap measuring apparatus and more particularly relates to apparatus for automatically optically determining the distance between superimposed, spaced apart surfaces.

When integrated circuits are made, semiconductor wafers are repeatedly coated with a photo-resist, and light patterns corresponding to the respective process steps to be carried out are used to expose the photoresist. In "proximity printing" used in most cases for carrying out this exposure, a mask with the pattern to be exposed in the photo-resist is arranged at a distance of approximately 20 $\mu$m from the photo-resist layer to be exposed, and a radiation of appropriate intensity is directed through the openings of the mask onto the photoresist layer. This distance, which depending on the subject boundary conditions can vary between 10 and 60 $\mu$m, may vary only negligibly (maximum $\pm$ 20%) for given boundary conditions, as otherwise the transferred patterns may be seriously disturbed.

The distance between mask and semiconductor wafer, which is also called gap, should therefore be controlled at least by random checks, which because of the small gap width to be checked, and the extreme sensitivity of the masks and the semiconductor wafers is preferably carried out by means of optical processes. However, the known highly precise interferometric techniques, because of the gap widths involved and due to the fact that the masks generally consist of extremely small and very irregularly structured and distributed openings, present numerous difficulties and are additionally very time consuming. A device specifically designed for this measuring process is described in the IBM Technical Disclosure Bulletin, Volume 16, No. 10, Mar. 1974, page 3284. It consists of a tiltable arm which includes a device for imaging a test pattern on the faces sandwiching the gap to be measured, in the present case mask and semiconductor wafer, and a focus detector for this image. By means of a micrometer screw the arm is moved in such a manner that the image is focused alternatingly on opaque mask areas and through mask apertures onto the semiconductor wafers. The difference of the values read on the micrometer equals the gap width.

As the gap width has to be read at a great many points so as to be able to detect not only deviations of position of the mask and semiconductor wafer planes, but also possible dislocations and other irregularities of the faces forming the gap the taking of such measurements is very time consuming, and when a high number of measurements have to be carried out, very tiring for the operator performing the focusing of the test patterns.

Apart from the inevitably occurring measurement errors such devices cannot be used for the continuous control of all exposures but only for random checks. Other known devices using the focusing of a light beam, as described for instance in German Pat. Nos. 1,036,038, 1,231,445 and 1,962,515, and in the literature reference "Digital Control of Distances", Applied Optics, 1967, Volume 6, No. 3, page 549 ff, are either too inaccurate or too complex, and they are susceptible to disturbances.

With the device for controlling the focusing in photographic enlargement devices, as described in German Pat. No. 1,036,038, where by means of the projection optics and via a tiltable mirror a test negative is projected, distance determination is also possible, but an automatic determination of distances with a precision in th order of tenths of $\mu$m is not possible.

The same criticism applies to the device described in German Pat. No. 1,231,445. With the optical measuring probe described in German Part. No. 1,962,515 for the contact-free measuring of the distance between the probe and the object surface, the precision required for the so called proximity printing are not reached even if microscope objectives are used. The device described in the literature reference "Digital Control of Distances", *Applied Optics* 1967, Volume 6, No. 3, page 549 ff permits of high precision measuring, but it is of such technical complexity that it appears impossible to use in connection with the continuous control of the manufacture of integrated circuits, both for financial reasons as well as with regard to the space required. The same applies to the literature reference IBM Technical Disclosure Bulletin, Volume 15, No. 2, July 1972, pages 504 and 505 where a profile measuring device is described with an objective lens moved periodically in the direction of the optical axis, and with several apertures which have to be adjusted with great accuracy.

BRIEF DESCRIPTION OF THE INVENTION AND ADVANTAGES

In the apparatus constructed in accordance with the invention, an objective lens and thus its image plane, oscillate with an amplitude of several hundred $\mu$m at approximately 100 cps in the direction of the optical axis. In this connection, and hereinafter, image plane is defined as the plane of most distinct optimized focus or image. If the position of the oscillating image plane coincides with one of the faces or object planes limiting the distance to be measured, an electrical signal indicating the existence of spatial coincidence is generated. A short time coincidence of the position of the image plane of the objective lens with one of the two surfaces limiting the distance to be measured respectively is indicated by two emitter-sensor surfaces each comprising at least one light-emitting and one light-accepting area. Since upon the coincidence of the image plane of the objective lens with an object surface or plane a sharply focused image of the light-emitting area of the emitter-sensor surface is formed which in turn is precisely imaged on the light-emitting area, no light reaches the light-accepting areas of the emitter-sensor surface. When the diameters of the light-emitting areas are slightly above the resolution of the oscillating objective lens no light will reach the light-accepting areas when focused, whereas in all other positions of the image plane, because of the double unfocused imaging of the light-emitting areas, (from the light-emitting area to the object face, and from there to the emiter-sensor surface) more or less light reaches the light-accepting areas.

When the emitter-sensor surfaces are designed as front sides of optical fiber bundles with statistically distributed light-emitting and light-accepting areas whose dimaeter corresponds respectively to the resolution of the optics used, the focusing and thus the measuring of the distance can be performed with a precision which formerly had been possible only with much more expensive, slow, and complex interferometers. With a sufficient oscillation frequency of the oscillating optics, and two closely adjacent emitter-sensor surfaces, points which are on planed displaced from each other in the direction of the optical axis and which are only slightly staggered laterally with respect to each other can be recorded within a few microseconds, so that disturbances caused by resonance vibration or other position changes of the measuring objective is substantially avoided. Because of simplicity of apparatus constructed in accordance with the invention and because of the its small dimensions as well as its resistance and low sensitivity to disturbances of the components used, it is possible to manufacture inexpensive measuring devices, and to use them for the continuous control of the mass production of e.g., integrated circuits.

In view of the above, it is the principal object of the invention to provide apparatus for automatically and accurately measuring the distances between adjacent but spaced apart surfaces.

Another object of the present invention is to measure very rapidly distances between 1 μm and several hundred m, with high precision on the order of ± 0.05 μm, the position of the surfaces limiting the distances to be measured to be determined within a period of less than one ms.

Other objects and a more complete understanding of the invention may be obtained with reference to the specification and claims taken in conjunction with the accompanying drawings wherein:

Figures 1, 2:
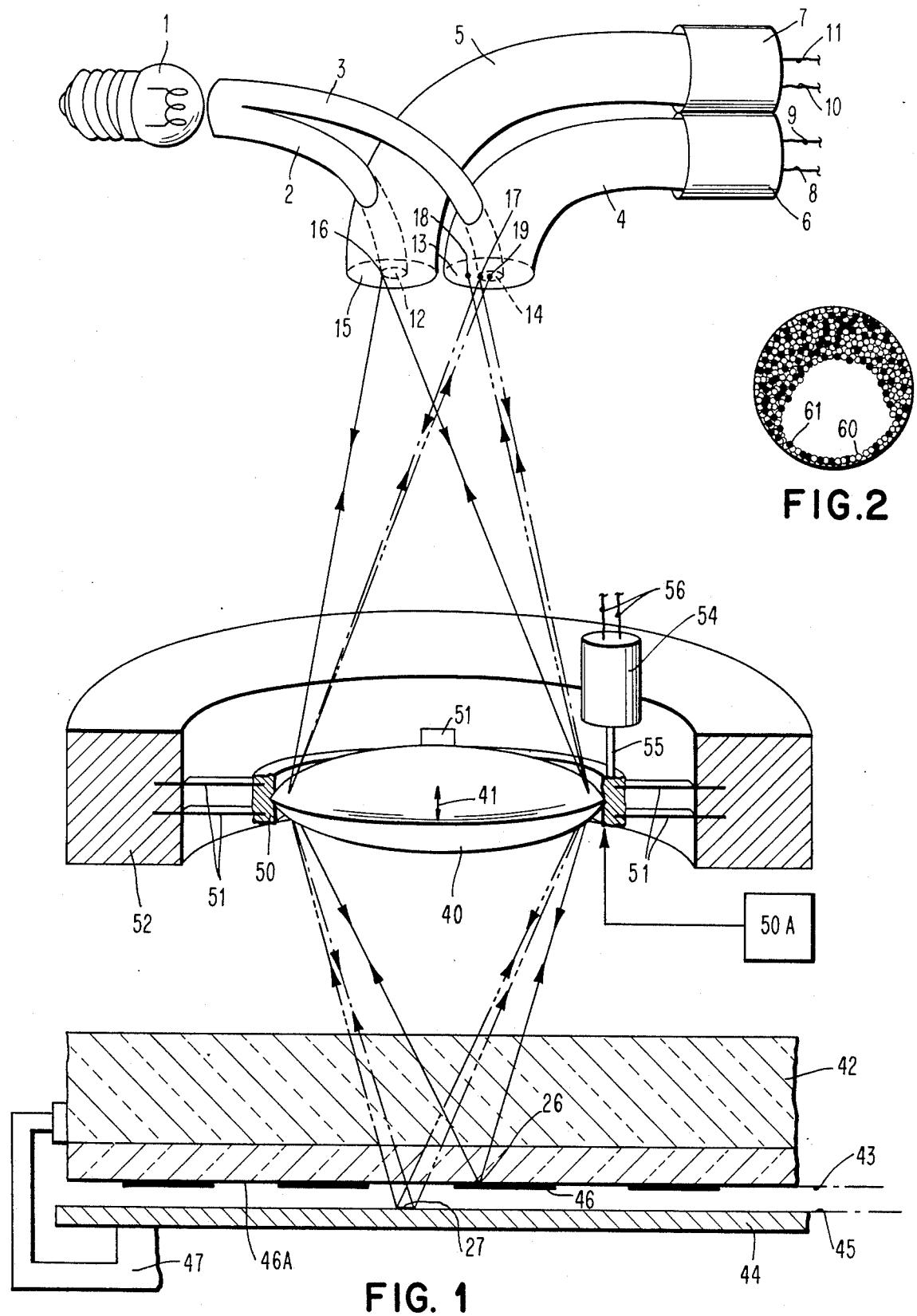
FIG. 1 is a fragmentary perspective schematic view of apparatus constructed in accordance with the present invention.
FIG. 2 is an enlarged fragmentary sectional view of another embodiment of an emitter sensor surface.

Turning now to the drawings and especially FIG. 1 thereof, apparatus constructed in accordance with the invention is illustrated therein, the apparatus comprising a lens 40 periodically shiftable parallel to its optical axis in the direction of arrow 41, and of two emitter-sensor surfaces or focus detectors each including a circular light-emitting area 12 and 14 respectively, and an annular light-accepting area 15 and 13 respectively, surrounding the former. As schematically shown in FIG. 1, a photo-mask 42 is held in a superimposed, spaced apart position above a photo-resist covered semiconductor wafer 44 as by a holder 47. The holder or holders may take any of a number of well known forms but should be capable of holding the wafer and mask in a proper spaced apart relation. A light-emitting point 16 of the circular area 12 is imaged via lens 40 on an opaque area 46 of mask 42 as a sharply focused light spot 26 since at that moment lens 40 is in a position where its image plane spatially coincides with object plane 43 of mask 42. As shown in the drawing, the mask 42 includes openings, transparent portions or light passages 46A to permit light passage therethrough. A light-emitting point 17 of circular area 14 is imaged through lens 40 and light passage 46A as an unfocused area 27 on the surface of a semiconductor wafer 44. The upper surface of the semiconductor wafer is covered with photo-resist which lies in a second object plane 45.

The light spot 27 is unfocused because at this moment the image plane of lens 40 is not identical with object plane 45. As shown in the drawing, the unfocused light spot 27, having a relatively large diameter, is imaged on the emitter-sensor face comprising areas 13 and 14 as an unfocused light spot between points 18 and 19. In the position of lens 40 as shown in the FIG. 1, the entire radiation emanating from light-emitting point 16 is fully reflected, after its imaging in object plane 43, into the area of light-emitting face 12, so that no light reaches light-accepting face 15 and thus no light reaches photo-sensitive element 7 via optical fibers 5. Alternately, the radiation emitted by light-emitting point 17 reaches, via the unfocused image 27 on the photo-resist covered face of semiconductor wafer 44, partly the area of light-emitting face 14, while the majority of the radiation impinges on light-accepting area 13 and is transferred via an optical fiber 4 to a photo-sensitive element 6.

Lens 40 is fixed in a metallic lens holder 50 which may be reciprocated by a magnetic field generated by alternating electromagnetic means 50A. When the lens holder is moved downwardly by an amount which equals the distance between the object planes 43 and 45, image 26 of light-emitting point 16 on opaque area 46 of mask 42 is unfocused, whereas image 27 of light-emitting point 17 on the photo-resist covered surface of semiconductor wafer 44 is focused. It is quite obvious that the radiation emitted by light-emitting point 16 reaches to a substantial amount light-accepting area 15, while the radiation from light-emitting point 17 is reflected to this point and thus does not reach light-accepting area 13. As shown in the drawing, lens holder 50 is held by springs 51 within a holding ring 52. If the holder 50 is oscillated by an alternating magnetic field, the amplitude of such oscillation being equal to, or greater than the distance between object planes 43 and 45, electrical signals will alternately appear at outputs 8, 9 and 10, 11 of photo-sensitive elements 6 and 7 respectively, the signals being a function of the light impinging on faces 13 and 15. It is obvious that upon a focused imaging of an emitter-sensor face 12, 15 or 13, 14 respectively at the outputs of the associated photo-sensitive elements there appears signals indicating a minimum of acceptance of light. Thus, the coincidence of the image plane of lens 40 with one of the object planes 43 or 45 is clearly indicated by the electric signals appearing at outputs 8, 9 or 10, 11 respectively.

The embodiments of the invention as represented by FIG. 1 also contains an electro-mechanical sensor or position indicating means 54 whose resiliently supported rod 55 is in constant contact with lens holder 50. At the outputs 56 of sensor 54, there will appear signals which at any moment give the exact position of holder 50. By the combination of the signals at the outputs 8, 9 and 10, 11 of photo-sensitive elements 6 and 7, with the signals at output 56 which will generally be of sinusoidal form, it is possible to obtain by means of a simple circuit as shown for instance in FIG. 3 (which is more fully described hereinafter), reliable data on the distance between planes 43 and 45. If the entire face of the arrangement comprised of mask 42 and semiconductor wafer 44 is scanned by a horizontal shifting of the arrangement, exact data on the distances of the two planes can be supplied quite easily and within a minimum of time and with great precision.

Another embodiment of an emitter-sensor surface is shown in FIG. 2, the surface comprising statisticallly distributed light-emitting areas 60 and light-accepting areas 61. The greater the number of the individual areas 60, 61 and the smaller their surfaces, the greater the precision with which the position of the image plane of lens 40, and thus the position of the two object planes 43 and 45 can be determined. While in the device of FIG. 1 the emitter-sensor face is obtained by plane grinding the front side of an optical fiber bundle which includes a circular central fuber bundle and a second fiber bundle annularly surrounding the former, the emitter-sensor face of FIG. 2 is generated in that the fibers of two fiber bundles are statistically mixed with each other and that the front side of the fiber bundle obtained is plane ground.

Figure 3:
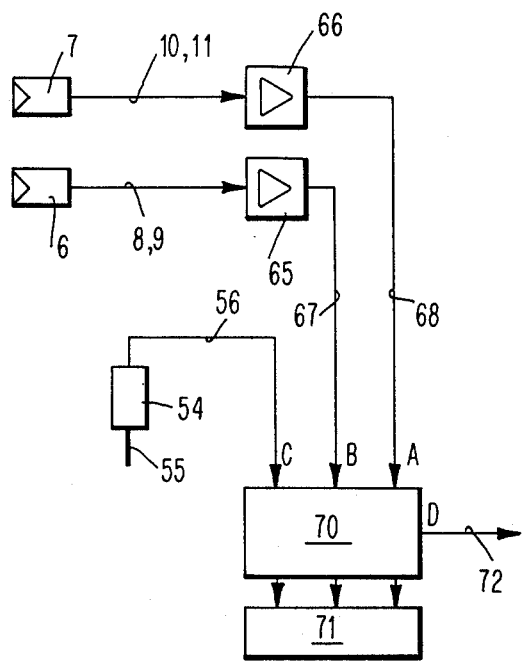
FIG. 3 is a schematic representation of a signal processing circuit for the pulses derived from the apparatus illustrated in FIG. 1.
Figure 4:
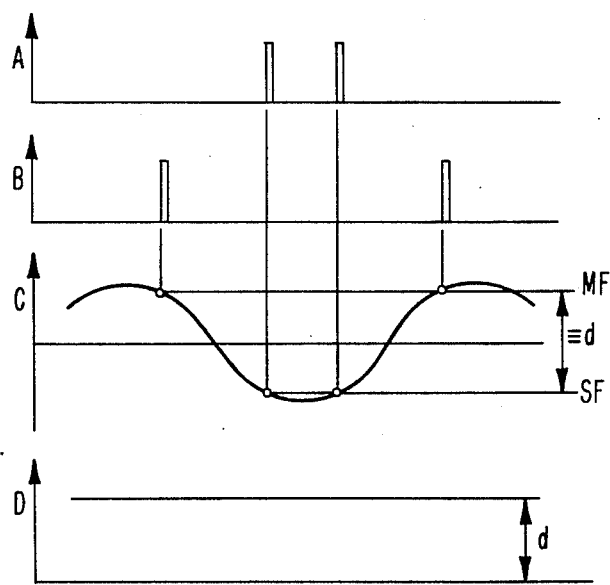
FIGS. 4A-4D are waveforms which explain the operation of the apparatus illustrated in FIGS. 1-3.

FIG. 3 represents a circuit for evaluating the electric signals generated by the apparatus shown in FIG. 1. The apparatus comprises photo-sensitive elements 6 and 7 which are connected to optical fiber bundles 4 and 5 (FIG. 1), and which via lines 8, 9 and 10, 11 respectively are connected to signal shapers and amplifiers 65, 66 respectively where the signals generated during the scanning of faces 43 and 45 are re-shaped in such a manner that upon the passing of the image plane of lens 40 through object planes 43 and 45 the rectangular pulses of FIG. 4 are formed. The circuit represented by FIG. 3 also includes a line 56 which connects sensor 54 which, as explained above in connection with FIG. 1, generates at its output a voltage corresponding to the position of lens 40, to a signal processing means 70 to which are applied simultaneously, via lines 67, 68 the signals generated by signal shapers and amplifiers 65 and 66. In this signal processing device, the momentary values (MF, SF) of the sinusoidal voltage transmitted via line 56 are determined at the moment of appearance of the rectangular pulses transmitted via lines 67 and 68, and deducted from each other. It is obvious that the difference between these values equals the distance between mask face 44 (object plane 43) with the opaque area, and photo-resist covered face (object plane) 45 of the semiconductor wafer 44. Via line 72 connected to the output of device 70, an electric signal is transmitted which is proportional to distance "d" between the two object planes 43 and 45. Upon a uniform distance of the adjacent faces of mask 42 and semiconductor wafer 44 this signa, as shown in FIG. 4D, will be a line which is parallel to the X-coordinate. When the distances change, the height of this line will change accordingly. This signal may, for instance, be used for eliminating semiconductor wafers where the distance to the mask is outside predetermined tolerances. It is also possible to effect with this signal a re-adjustment of the distance between mask and semiconductor wafer. At the same time, the profile, obtained through a scanning by means of the device of FIG. 1, of the faces of mask 42 and semiconductor 44 facing each other may be rendered visible by means of a screen 71.

The signal processing means 70 functions to subtract the incidence of the pulses coming from the photo-sensitive elements 6 and 7 relative to the signal developed by the lens position indicating device 54. To this end, the signal processing means may include, by way of example, a pair of sample and hold circuits (such as Hybrid Systems Corp., SH 725LH) the outputs of which are coupled to a differential amplifier. For example, if the inputs to the sample and hold circuits are connected to line 56, and the mode control input to respective sample and hold circuits is connected respectively to input B (line 67, FIG. 3) and input A (line 68, FIG. 3), the differential amplifier connected to the output of the sample and hold circuits will given an output that is proportional to the distance between object planes 43 and 45.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. In an apparatus for measuring the distance between a semiconductor device mask superimposed over a semiconductor substrate in spaced object planes with said mask having transparent portions therein to permit light passage therethrough to said substrate, said apparatus comprising: an imaging means spaced from said mask and said substrate; light-emitter means for projecting light through said imaging means and forming spaced image planes of at least a portion of said mask and said substrate; focus detector means adjacent said light-emitter means; means for oscillating said image planes in the optical axis of said imaging means, alternately into and out of coincidence with said detector; means associated with said focus-detector means for generating an electrical signal indicative of coincidence of said image planes with said detector position indicating means for generating an electrical output corresponding to the amplitude and frequency of said oscillation and signal processing means for receiving said electrical signals from said position indicating means and from said focus detector means for supplying an electrical signal output proportional to the difference in distance between said object planes.

2. Apparatus in accordance with claim 1 wherein said light emitter means and said focus detector means comprise a sensor-emitter surface, said surface lying in a single plane.

3. Apparatus in accordance with claim 1 wherein said light-emitter means and said focus detector means comprise a sensor-emitter surface.

4. Apparatus in accordance with claim 3 wherein said emitter surface is surrounded by said sensor surface.

5. Apparatus in accordance with claim 3 wherein said emitter-sensor surfaces comprise distributed light-emitting and light-accepting areas.

6. Apparatus for determining the distance between at least two spaced apart, superimposed object surfaces, at least the upper of said surfaces having light passage portions therein to permit light passage therethrough to the lower one of said surfaces, said apparatus comprising: means to support the surfaces in spaced apart, superposed relation; at least first and second probes for respectively the upper and lower ones of said object surfaces, with each one of said probes having probe surfaces on a common plane and comprised of adjacent light sensor and light emitter areas; a lens means intermediate said object and probe surfaces for concurrently projecting and reflecting light therebetween; means for oscillating said lens in the direction of its optical axis in an amplitude of oscillation at least equal to the distance between said object surfaces and spaced from said object surfaces a distance sufficient to shift alternate ones of the image planes, of the corresponding said spaced object surfaces, into and out coincidence with an associated probe surface as said lens oscillates; position indicating means for determining the position of said lens as said lens is oscillating, and for generating an electrical signal indicative of the frequency and amplitude of said oscillation; photo-sensitive means connected to said light-accepting areas of said light sensor-emitter surfaces for converting light received by said light-accepting areas into electrical signals; and signal processing means for receiving said electrical signals from said position indicating means and said photo-sensitive means and for supplying an electrical signal output proportional to the difference in distance between said surfaces.

7. Apparatus in accordance with claim 6 wherein said emitter surface is surrounded by said sensor surface.

8. Apparatus in accordance with claim 6 wherein said emitter-sensor surfaces comprise distributed light-emitting and light-accepting areas.

9. Apparatus in accordance with claim 6 wherein said light emitter means and said focus detector means comprise a sensor-emitter surface, said surface lying in a single plane.

* * * * *